(12) United States Patent
Ito et al.

(10) Patent No.: US 7,356,471 B2
(45) Date of Patent: Apr. 8, 2008

(54) ADJUSTING SOUND CHARACTERISTIC OF A COMMUNICATION NETWORK USING TEST SIGNAL PRIOR TO PROVIDING COMMUNICATION TO SPEECH RECOGNITION SERVER

(75) Inventors: Toshiyuki Ito, Toyohashi (JP); Hiroshige Asada, Nagoya (JP)

(73) Assignee: DENSO Corporation, Kariya (JP)

( * ) Notice: Subject to any disclaimer, the term of this patent is extended or adjusted under 35 U.S.C. 154(b) by 898 days.

(21) Appl. No.: 10/601,997

(22) Filed: Jun. 23, 2003

(65) Prior Publication Data
US 2004/0030553 A1 Feb. 12, 2004

(30) Foreign Application Priority Data
Jun. 25, 2002 (JP) .............................. 2002-184627

(51) Int. Cl.
*G10L 21/00* (2006.01)
*G06F 3/16* (2006.01)
*H04M 3/42* (2006.01)
(52) U.S. Cl. ................................. 704/270.1; 379/22.01
(58) Field of Classification Search ................ 704/234, 704/270.1; 379/22.01

See application file for complete search history.

(56) References Cited

U.S. PATENT DOCUMENTS

| 5,646,991 | A  | * | 7/1997  | Sih ............................. 704/219 |
| 5,774,842 | A  | * | 6/1998  | Nishio et al. ............... 704/226 |
| 6,205,421 | B1 | * | 3/2001  | Morii ......................... 704/226 |
| 6,574,601 | B1 | * | 6/2003  | Brown et al. ............ 704/270.1 |
| 6,990,446 | B1 | * | 1/2006  | Huang et al. ............... 704/240 |
| 2002/0065650 | A1 | * | 5/2002  | Christensson et al. ...... 704/228 |
| 2002/0173957 | A1 | * | 11/2002 | Kawane et al. ............. 704/234 |
| 2005/0114124 | A1 | * | 5/2005  | Liu et al. .................... 704/228 |
| 2006/0200353 | A1 | * | 9/2006  | Bennett ................... 704/270.1 |

FOREIGN PATENT DOCUMENTS

JP 2000-286762 10/2000

\* cited by examiner

*Primary Examiner*—Tālivaldis Ivars Šmits
(74) *Attorney, Agent, or Firm*—Harness, Dickey & Pierce, PLC

(57) ABSTRACT

A voice recognition system has a vehicle unit, which is a communication terminal, and a voice recognition server. The voice recognition server recognizes a voice signal received from the vehicle unit. A sound characteristic of a communication channel for providing communication between the vehicle unit and the server requires to be adjusted so that the server properly recognizes the voice signal. A test pattern signal is used for adjusting the sound characteristic. The vehicle unit adjusts the sound characteristic based on the test pattern signal. Therefore, the server does not require a large database for the sound characteristic adjustment because it is performed by the vehicle unit.

10 Claims, 4 Drawing Sheets

ADJUSTING SOUND CHARACTERISTIC OF A COMMUNICATION NETWORK USING TEST SIGNAL PRIOR TO PROVIDING COMMUNICATION TO SPEECH RECOGNITION SERVER

REFERENCE TO RELATED APPLICATIONS

This application is based on Japanese Patent Application No. 2002-184627 filed on Jun. 25, 2002, the contents of which are incorporated herein by reference.

BACKGROUND OF THE INVENTION

1. Field of the Invention

The present invention relates to a voice recognition system, a communication terminal, a voice recognition server and a computer program, more particularly to sending a voice signal from the communication terminal to the voice recognition server and to recognizing the voice signal from the communication terminal received by the voice recognition server.

2. Description of Related Art

A voice recognition system has a communication terminal and a voice recognition server. The communication terminal sends an inputted voice signal to the voice recognition server. The voice recognition server recognizes the voice signal from the communication terminal. The communication terminal may be installed in a vehicle. In this case, the voice signal is inputted to the communication terminal and sent to the voice recognition server via a communication network. For example, if a user inputs words "route search" to the vehicle unit, the vehicle unit sends the voice signal to the voice recognition server via a communication network. When the voice recognition server receives the voice signal from the vehicle unit, the voice recognition server recognizes the received voice signal. Then the voice recognition server searches a route between a present position and a destination based on the recognized voice signal, and sends the search result to the vehicle unit via the communication network. When the vehicle unit receives the search result, the vehicle unit shows the route information on a display. Therefore, the user is provided with information of the route between the present position and the destination just by uttering the words "route search".

In such a voice recognition system, a sound characteristic of a communication network between the vehicle unit and the voice recognition server requires to be adjusted so that the voice recognition server recognizes properly the voice signal. The sound characteristic is generally adjusted by the voice recognition server.

However, adjusting the sound characteristic by the voice recognition server requires a large database. That is because the voice recognition server communicates with multiple vehicle units or other communication devices, such as personal digital assistant terminals (PDA). Moreover, if such a database is not provided, the voice recognition server does not properly recognize the voice signal, and cannot get a desired performance for voice recognition.

SUMMARY OF THE INVENTION

In view of the foregoing situation, it is an object of the present invention to provide a voice recognition system, a communication terminal, a voice recognition server and a computer program for reducing a burden of the voice recognition server and increasing a reliability of voice recognition at the voice recognition server.

According to one aspect of the present invention, a voice recognition system comprises, a communication terminal that sends a voice communication signal through a communication network, and a voice recognition server that recognizes the voice communication signal received from the communication terminal, wherein the communication terminal adjusts a sound characteristic of the communication network for providing communication between the communication terminal and the voice recognition server.

BRIEF DESCRIPTION OF THE DRAWINGS

The above and other objects, features and advantages of the present invention, will become more apparent from the following detailed description made with reference to the accompanying drawings. In the drawings.

DETAILED DESCRIPTION OF PREFERRED EMBODIMENTS

Figure 1:
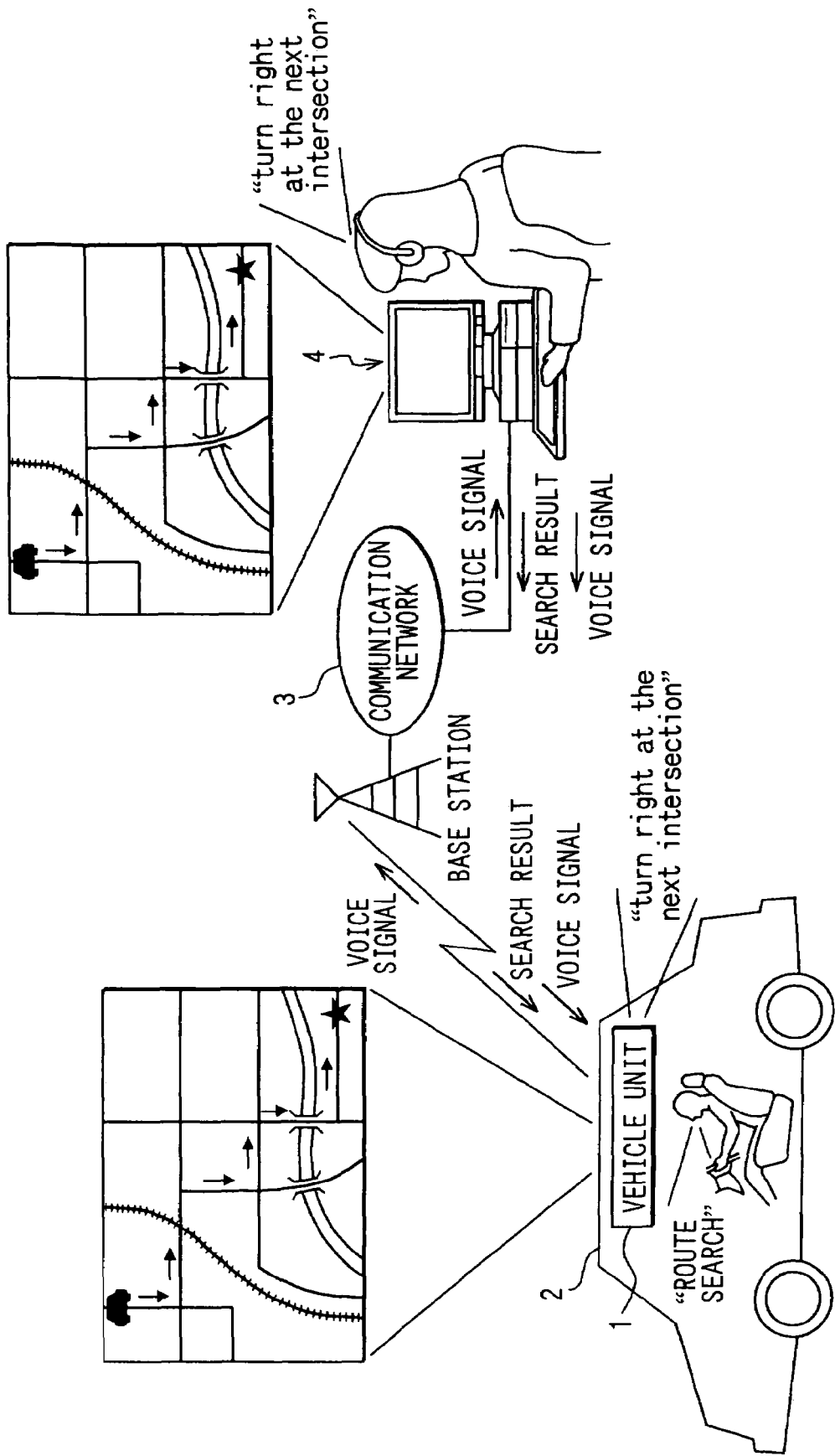
FIG. 1 is a block diagram of a voice recognition system of an embodiment of the present invention.

Referring to FIG. 1, a voice recognition system has a vehicle unit 1, which is a communication terminal, and a voice recognition server 4. The vehicle unit 1 is installed in a vehicle 2.

The vehicle unit 1 sends a voice signal to the voice recognition server 4 via a communication network 3. The communication network 3 includes cellular telephone networks, communication channels, landline networks, and relevant communication facilities. The communication network 3 provides communication between the vehicle unit 1 and the voice recognition server 4. The voice recognition server 4 includes a general personal computer. When the server 4 receives a voice signal from the vehicle unit 1, the server 4 recognizes the received voice signal and then operates an appropriate transaction based on the recognition result.

For example, when a user in the vehicle 2 utters the words "route search", the vehicle unit 1 receives the uttered words, processes the words into a voice signal, and sends it to the server 4 via the communication network 3. When the server 4 receives the voice signal from the vehicle unit 1, the server 4 recognizes the received voice signal as a command of "route search". Then, the server 4 searches an appropriate route between a present position of the vehicle 2 and a destination, and sends a search result to the vehicle unit 1 via the communication network 3.

When the vehicle unit 1 receives the search result from the server 4, the vehicle unit 1 shows the result of the route search on a display. Therefore, the user is provided with information of the route between the present position and the destination just by uttering the words "route search". One example of the searched result between a present position (as shown by "vehicle" mark) and a destination (as shown by "star" mark) is shown in the FIG. 1.

On the server 4 side, an operator can control the server 4 to provide requested information to the user in the vehicle 2. The operator can look the search result sent to the vehicle unit 1. Accordingly, the operator can provide appropriate route guidance to the user based on the search result. For example, if the operator says the words "turn right at the next intersection", the server 4 sends a voice signal corresponding to the words to the vehicle unit 1 via the communication network 3.

When the vehicle unit 1 receives the voice signal, the vehicle unit 1 produces a sound of a voice that says "turn right at the next intersection". Accordingly, the user can receive appropriate route guidance from the operator.

Figure 2:
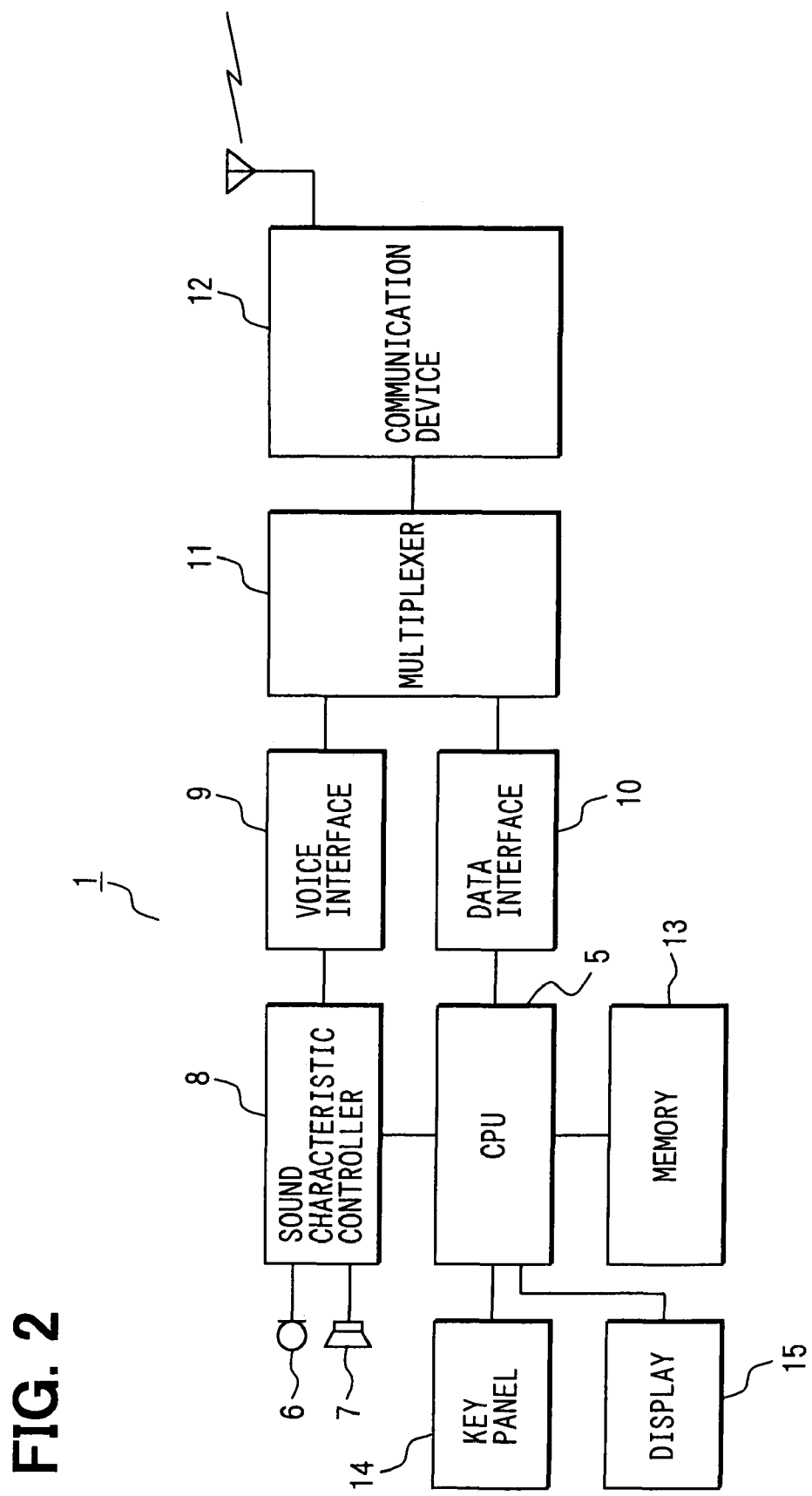
FIG. 2 is a block diagram of a vehicle unit.

Referring to FIG. 2, the vehicle unit 1 includes a Central Processing Unit (CPU) 5, a microphone 6, a speaker 7, a sound characteristic controller 8, a voice interface 9, a data interface 10, a multiplexer 11, a communication device 12, a memory 13, a key panel 14, and a display 15. The CPU 5 executes a control program.

The microphone 6 is installed in the vehicle 2 in a position suitable to collect a voice from the user. When the microphone 6 receives the voice uttered by the user, the microphone 6 produces a voice signal corresponding to the uttered words and sends it to the sound characteristic controller 8.

The sound characteristic controller 8 decides and adjusts an appropriate sound characteristic of the communication channel of the communication network 3 between the vehicle unit 1 and the server 4. The sound characteristic controller 8 includes an echo canceller. When the controller 8 receives the voice signal from the microphone 6, it adjusts a sound characteristic of the voice signal to the appropriate sound characteristic and sends the adjusted voice signal to the voice interface 9. When the controller 8 receives a voice signal from the voice interface 9, it adjusts a sound characteristic of the signal to appropriate sound characteristic and sends the adjusted voice signal to the speaker 7.

The voice interface 9 converts the voice signal, received from the controller 8, to a transmittable voice signal, and sends it to the multiplexer 11. The voice interface 9 converts the transmittable voice signal, received from the multiplexer 11, to a voice signal, and sends it to the sound characteristic controller 8. The data interface 10 converts a data signal, received from the CPU 5, to a transmittable data signal, and sends it to the multiplexer 11. The data interface 10 converts a transmittable data signal, received from the multiplexer 11, to a data signal, and sends it to the CPU 5.

The multiplexer 11 multiplexes the transmittable voice signal and the transmittable data signal, received from the voice interface 9 and from the data interface 10, as a multiplexed signal. The multiplexer 11 then sends the multiplexed signal to the communication device 12. The multiplexer 11 demultiplexes a multiplexed signal, received from the communication device 12, to a transmittable voice signal and/or a transmittable data signal. The multiplexer 11 then sends the transmittable voice signal to the voice interface 9, and sends the transmittable data signal to the data interface 10. The communication device 12 transmits the multiplexed signal, received from the multiplexer 11, to the server 4 via the communication network 3. The communication device 12 sends the multiplexed signal, received from the server 4, to the multiplexer 11.

The memory 13 stores different kinds of data. The key panel 14 includes keys and push buttons for the user to manipulate. The key panel 14 may include a touch screen that the display 15 shows. The display 15 shows a current time, guidance for indicating a notice to the user, and other information, such as a map and a route received from the server 4.

The vehicle unit 1 operates either in a call mode or in a voice recognition mode. In the call mode, the user can talk with the operator of the server 4. In the voice recognition mode, the server 4 recognizes a voice signal received from the vehicle unit 1 and the user cannot talk with the operator.

Figure 3:
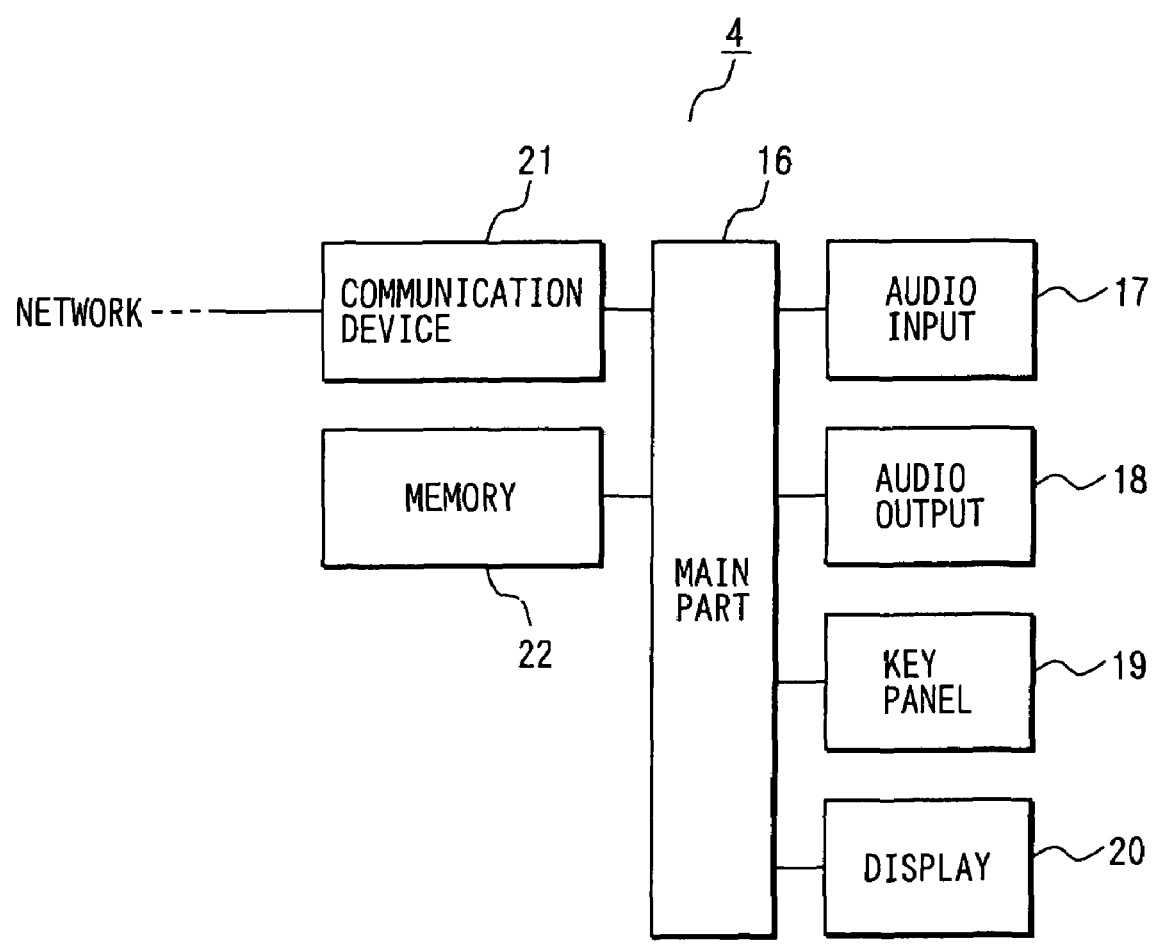
FIG. 3 is a block diagram of a voice recognition server.

Referring to FIG. 3, the voice recognition server 4 includes a main unit 16, an audio input device 17, an audio output device 18, a key panel 19, a display 20, a communication device 21, and a memory 22. The main unit 16 includes a CPU that executes a control program. The audio input device 17 receives a voice that is uttered by the operator. The audio output device 18 produces a voice corresponding to a word received from the vehicle unit 1. The key panel 19 includes keys for the operator to manipulate. The display 20 shows different kinds of information. The vehicle unit 1 and the server 4 are configured to simultaneously transmit or receive voice signals and data signals between them.

Figure 4:
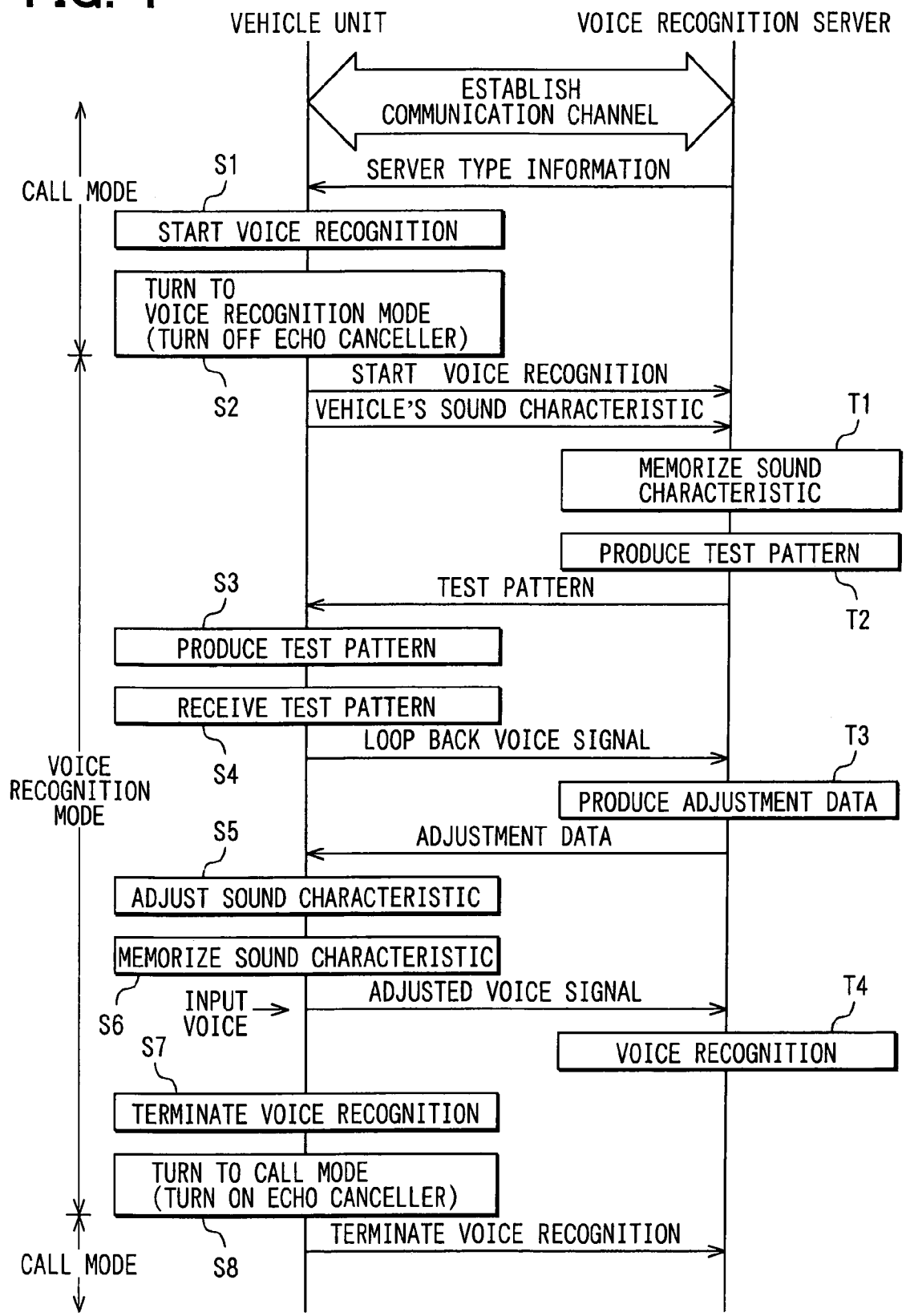
FIG. 4 is a sequence diagram of a voice recognition system.

Referring to FIG. 4, when a communication channel is established between the vehicle unit 1 and the server 4, the server 4 transmits server-type information that represents a type of the server 4. After the vehicle unit 1 receives the server-type information, the user can indicate a start of a voice recognition process with the server 4. When the user indicates the start (step S1), the vehicle unit 1 turns from the call mode to the voice recognition mode (step S2). The vehicle unit 1 turns off the echo canceller to cancel a function of echo canceller. Then, the vehicle unit 1 transmits an instruction massage to the server 4 to start the voice recognition process. The vehicle unit 1 also transmits a sound characteristic that is peculiar to the vehicle unit 1.

When the server 4 receives the instruction and the peculiar sound characteristic from the vehicle unit 1, it stores the peculiar sound characteristic in the memory 22 (step T1). Then, the server 4 creates a test pattern voice signal by an electrical composition (step T2), and transmits it to the vehicle unit 1.

When the vehicle unit 1 receives the test pattern voice signal, it processes the test pattern voice signal and produces a test sound from the speaker 7 based on the test pattern voice signal (step S3). Then, the vehicle unit 1 collects the test sound via the microphone 6 (step S4). The vehicle unit 1 processes the received test sound to a loop back voice signal and transmits it to the server 4.

The server 4 analyzes the loop back voice signal and produces an adjustment data based on the analysis. The adjustment data represents a sound characteristic of the communication channel (step T3). Then, the server 4 transmits the adjustment data to the vehicle unit 1.

When the vehicle unit 1 receives the adjustment data, the controller 8 searches an appropriate sound characteristic based on the adjustment data and determines an appropriate sound characteristic of the communication channel. Then, the vehicle unit 1 stores the appropriate sound characteristic in the memory 13 (step S6).

Thereafter, when the vehicle unit 1 receives a word uttered by the user via the microphone 6, the microphone 6 produces a voice signal. The controller 8 adjusts the sound characteristic of the voice signal to the appropriate sound characteristic. Then, the vehicle unit 1 transmits the adjusted voice signal to the server 4. When the server 4 receives the adjusted voice signal, it recognizes the adjusted voice signal (step T4).

When the user instructs the vehicle unit 1 to terminate the voice recognition process (step S7), the vehicle unit 1 turns from the voice recognition mode to the call mode (step S8). The vehicle unit 1 turns on the echo canceller to activate a function of echo canceller. The vehicle unit 1 transmits an instruction massage to the server 4 to terminate the voice recognition process.

The server 4 does not require a large database for the sound characteristic adjustment because it is performed by the vehicle unit 1. This reduces a burden on the server 4 and increases the reliability of the voice recognition.

The present invention should not be limited to the embodiment previously discussed and shown in the figures, but may be implemented in various ways without departing from the spirit of the invention. For example, the test pattern voice signal may be created by a word of the operator, an audio broadcast signal, or any other information. If the word of the operator is used for the test pattern voice signal, the vehicle unit 1 adjusts the sound characteristic as appropriate based on the word. In addition, if the server 4 is configured to provide audio broadcast services, which include news, weather forecasts and stock prices, the server 4 and the vehicle unit 1 may use the audio broadcast signal as the test pattern voice signal.

In such modifications, the sound characteristic can be adjusted simply because the server 4 does not require a special test pattern voice signal, which is only for adjusting the sound characteristic.

The vehicle unit 1 can be a detachable-type or a module-type unit as long as it can be mountable to the vehicle 2. The communication terminal can be a portable information terminal or other communication terminal, other than a vehicle unit 1. The operator at the server 4 is not always necessary. The noise canceller may be controlled according to the modes that are switched between the call mode and the voice recognition mode.

The computer programs, which are run by the CPU of both the vehicle unit 1 and the server 4, can be installed into the memories 13, 22 at the manufacturing of both the vehicle unit 1 and the server 4. The computer programs may be downloaded from a certain server via the communication network or may be read from a Compact Disk Read Only Memory (CD-ROM) or a magnetic card.

What is claimed is:

1. A voice recognition system comprising:
   a communication terminal that transmits a first voice signal through a communication network; and
   a voice recognition server that recognizes the first voice signal received from the communication terminal,
   wherein the communication terminal includes means for adjusting a sound characteristic of the communication network prior to providing communication from the communication terminal to the voice recognition server.

2. The voice recognition system according to claim 1, wherein:
   the voice recognition server transmits a second voice signal to the communication terminal,
   the communication terminal produces a sound based on the second voice signal, receives the sound as a loop back voice signal, and transmits the loop back voice signal to the voice recognition server,
   the voice recognition server receives and analyzes the loop back voice signal, and produces adjustment data based on the analysis, the adjustment data represents the sound characteristic of the communication network, and
   the communication terminal adjusts the sound characteristic based on the adjustment data.

3. The voice recognition system according to claim 2, wherein:
   the second voice signal transmitted by the voice recognition server is a test pattern voice signal created by an electrical composition, and
   the communication terminal adjusts the sound characteristic of the communication network based on the adjustment data produced by the test pattern voice signal.

4. The voice recognition system according to claim 2, wherein:
   the second voice signal transmitted by the voice recognition server is a created voice signal that is created by a word of an operator of the voice recognition server, and
   the communication terminal adjusts the sound characteristic of the communication network based on the adjustment data produced by the second voice signal.

5. A voice recognition server used in a voice recognition system having a communication terminal which sends a first voice signal via a communication network, for recognizing the first voice signal received from the communication terminal, comprising:
   voice signal transmitting means for transmitting a second voice signal to the communication terminal;
   loop back signal receiving means for receiving a loop back voice signal that is the second voice signal produced and received by the communication terminal;
   adjustment data producing means for producing adjustment data which represents a sound characteristic of the communication network, the adjustment data is produced by analyzing the loop back voice signal received from the communication terminal; and
   adjustment data transmitting means for transmitting the adjustment data produced by the adjustment data producing means to the communication terminal.

6. A computer-readable memory medium comprising a computer program that is run by a communication terminal used in a voice recognition system, for sending first a voice signal to a voice recognition server via a communication network, the voice recognition server recognizes the first voice signal received from the communication terminal, to carry out:
   a process of receiving a second voice signal from the voice recognition server;
   a process of producing a test sound based on the second voice signal received from the voice recognition server;
   a process of receiving the test sound and producing a loop back voice signal based on the received test sound;
   a process of transmitting the loop back voice signal to the voice recognition server;
   a process of receiving adjustment data from the voice recognition server, the adjustment data is produced by analyzing the loop back voice signal and represents a sound characteristic of the communication network; and
   a process of adjusting the sound characteristic of the communication network base on the adjustment data received from the voice recognition server.

7. A computer-readable memory medium comprising a computer program which is run by a voice recognition server used in a voice recognition system, for recognizing a first voice signal received from a communication terminal via a communication network, the communication terminal sends the first voice signal to the voice recognition server, to carry out:
   a process of transmitting a second voice signal to the communication terminal;
   a process of receiving a loop back voice signal that is the second voice signal produced and received by the communication terminal, a process of producing adjustment data of a sound characteristic of the communication network, the adjustment data is produced by analyzing the loop back voice signal received from the communication terminal; and a process of transmitting the adjustment data to the communication terminal.

8. A voice recognition system comprising:

a communication terminal that transmits a voice signal through a communication network; and a voice recognition server that recognizes the voice signal received from the communication terminal, wherein the communication terminal transmits a sound characteristic that is peculiar to the communication terminal to the voice recognition server, the recognition server stores the sound characteristic received from the communication terminal, the voice recognition server transmits the voice signal to the communication terminal, the communication terminal outputs the voice signal under a condition where a function of an echo canceller is deactivated and transmits the received voice signal as a loop back voice signal to the voice recognition server, the voice recognition server analyzes the loop back voice signal with the stored sound characteristic peculiar to the communication terminal, the voice recognition server produces adjustment data representing the sound characteristic of the communication network between the communication terminal and the voice recognition server, and transmits the adjustment data to the communication terminal, and the communication terminal corrects the sound characteristic of the communication network between the communication terminal and the voice recognition server based on the adjustment data received from the voice recognition server.

9. A voice recognition system according to claim 8, wherein the voice recognition server transmits a test pattern voice signal created by an electrical composition to the communication terminal, and the communication terminal corrects the sound characteristic of the communication network between the communication terminal and the voice recognition server based on the adjustment data which is generated based on the test pattern voice signal.

10. A voice recognition system according to claim 8, wherein the voice recognition server transmits a created voice signal created by an operator to the communication terminal, and the communication terminal corrects the sound characteristic of the communication network between the communication terminal and the voice recognition server based on the adjustment data which is generated based on the created voice signal of the operator.

* * * * *